United States Patent
Katayama et al.

[11] Patent Number: 5,867,180
[45] Date of Patent: Feb. 2, 1999

[54] INTELLIGENT MEDIA MEMORY STATICALLY MAPPED IN UNIFIED MEMORY ARCHITECTURE

[75] Inventors: Yasunao Katayama, Kanagawa, Japan; Stephen V. Kosonocky, Darien, Conn.; Seiji Munetoh, Tokyo, Japan

[73] Assignee: International Business Machines Corporation, Armonk, N.Y.

[21] Appl. No.: 816,601

[22] Filed: Mar. 13, 1997

[51] Int. Cl.⁶ .................................................. G06F 15/167
[52] U.S. Cl. ........................ 345/512; 345/519; 345/520; 345/508
[58] Field of Search ........................... 345/501, 507–509, 345/512, 520, 521, 519; 711/173, 170

[56] References Cited

U.S. PATENT DOCUMENTS

| | | | |
|---|---|---|---|
| 4,665,495 | 5/1987 | Thaden | 345/507 |
| 4,922,432 | 5/1990 | Kobayashi et al. | 345/441 |
| 5,148,524 | 9/1992 | Harlin et al. | 345/519 |
| 5,258,919 | 11/1993 | Yamanouchi et al. | 364/489 |
| 5,291,580 | 3/1994 | Bowden, III et al. | 711/5 |
| 5,404,338 | 4/1995 | Murai et al. | 365/253 |
| 5,432,707 | 7/1995 | Leung | 364/489 |
| 5,473,566 | 12/1995 | Rao | 365/189.12 |
| 5,636,174 | 6/1997 | Rao | 365/230.03 |
| 5,659,715 | 8/1997 | Wu et al. | 345/507 |
| 5,678,009 | 10/1997 | Bains et al. | 395/305 |
| 5,694,143 | 12/1997 | Fielder et al. | 345/501 |
| 5,748,938 | 5/1998 | Kahle | 711/119 |

OTHER PUBLICATIONS

Akira Yamazaki, et al., "A Cache DRAM for Graphic Application", Oct. 1993, Technical Report of IEICE, pp. 9–14.

*Primary Examiner*—Kee M. Tung
*Attorney, Agent, or Firm*—Whitham, Curtis & Whitham; Robert P. Tassinari, Esq.

[57] ABSTRACT

A Unified Memory Architecture (UMA) using intelligent media memory provides an improved way of solving the granularity and memory bandwidth problems in the electronic computer memory system. A specially designed memory chip is attached to an existing attachment point of the system by integrating the bus interface on the memory chip. The memory chip additionally integrates on-chip data-intensive computation functions with the dynamic random access memory (DRAM) macros. Two system attachment points for the new integrated DRAM and logic chip are disclosed; the first using the local central processing unit (CPU) bus interface, and the second using a combination of the main memory bus and an alternative system bus such as a Peripheral Component Interconnect (PCI) bus.

7 Claims, 5 Drawing Sheets

INTELLIGENT MEDIA MEMORY STATICALLY MAPPED IN UNIFIED MEMORY ARCHITECTURE

BACKGROUND OF THE INVENTION

1. Field of the Invention

The present invention generally relates to a memory system for electronic computer systems and the like, and more particularly to an improved method and apparatus for a computer memory system where high-bandwidth and flexible frame-buffer configuration are needed, without granularity problems, for image and graphics drawings as well as screen refresh operations in a high resolution video display.

2. Background Description

The original International Business Machines (IBM) personal computer (PC) display memory comprised a reserved sixty-four kilobyte (64 KB) block of random access memory (RAM) address space of which 4 KB was used for a monochrome character based display adapter and 16 KB was used for an optional color graphics display adapter (CGA). The additional reserved address space was intended for higher resolution displays than the original monochrome and color graphics displays. This memory address allocation was based on the one megabyte (1 MB) of addressing available to the 16-bit internal architecture of the Intel 8088 microprocessor used in the IBM PC. To provide backward compatibility, this "legacy" address space was retained in successive generations of microprocessors and operating systems. The first of the higher resolution displays was the enhanced graphics adapter (EGA) display specification, and this was followed by the video graphics array (VGA) display specification.

Today, PCs are being used for ever more demanding display functions, especially in multi-media applications and computer aided design (CAD) and graphics rendering applications. Multi-media applications include full motion video clips using the Motion Picture Expert Group (MPEG) standard. CAD and graphics rendering applications are used to generate three dimensional (3D) views which may be used to "visualize" a physical structure including a simulated walk through the structure.

These demanding display functions require more and more memory allocations, but simply adding memory addresses dedicated to the display function does not solve the problem and, in fact, creates new problems. First of all there is a data rate or bandwidth problem in simply getting the data in memory to the display adapter that generates the displayed image. Secondly, some proposed solutions to the data rate problem in turn create a granularity problem. These and other display problems are expected to become worse in the future.

One approach to solving the display memory problems is the adoption of the Unified Memory Architecture (UMA) specification where the main memory and frame-buffer are combined into a single memory system. This architecture has the advantage that it can reduce the total memory capacity by flexibly sharing the memory area for main memory and frame-buffer and can solve the granularity problem for low-end PCs. However, UMA display systems are known to have performance problems when the graphics performance and resolution demands increase.

SUMMARY OF THE INVENTION

It is therefore an object of the present invention to provide an improved way of solving the granularity and memory bandwidth problems in the electronic computer memory system.

It is another object of the invention to provide an improved way of reducing the power consumption even under the higher memory bandwidth requirement.

It is a further object of the invention to provide an improved memory system with flexible configurations of the multiple frame buffers.

According to the present invention, there is provided an improved memory system control method, without additional hard wire control, by attaching a specially designed memory chip to an existing attachment point of the computer system. This is made possible by integrating the bus interface on the memory chip. In addition, the memory chip integrates bus interface logic and on-chip data-intensive computation functions with the dynamic RAM (DRAM) memory macros. Two system attachment points for the new integrated DRAM and logic chip are disclosed; the first using the local central processing unit (CPU) bus interface, and the second using a combination of the main memory bus and an alternative system bus such as a Peripheral Component Interconnect (PCI) bus.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Prior Display Architectures

Figure 1:
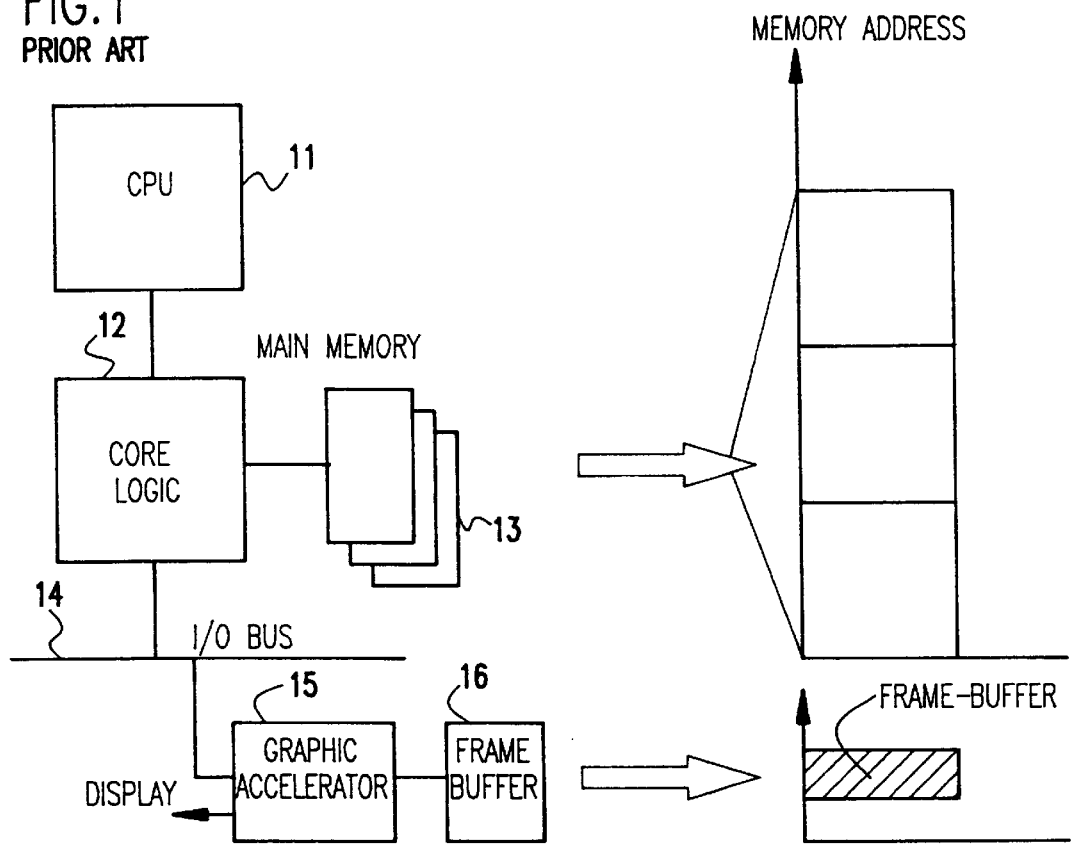
FIG. 1 is a block diagram showing an example of a separate frame-buffer and main memory system.

In order to better understand the invention, examples of prior memory systems and solutions to the display problems outlined above will first be described. Referring now to the drawings, and more particularly to FIG. 1, there is shown an example of electronic computer systems where a dedicated memory system is used for the frame-buffer, seen in the VGA (Video Graphics Array) and the like of current personal computer systems (PCs). On the left hand side of the drawing figure is shown the relevant hardware of the personal computer, and on the right hand side of the drawing figure is shown the corresponding memory address space. The computer system comprises a central processing unit (CPU) 11 which is interfaced by core logic 12 to both a main memory 13 (i.e., RAM) and an input/output (I/O) bus 14. Attached to the I/O bus 14 is a graphic accelerator 15 having a frame buffer 16. The output of the graphic accelerator goes to a display (not shown) such as a cathode ray tube (CRT). It will be observed in this computer architecture that the frame-buffer address space is separate from that of the main memory.

It is conventional to present the output from the computer's frame buffer 16 as an image on the screen of a cathode ray tube (CRT) or the like at a constant rate (called the screen refresh operation). The display image is composed of a collection of pixels stored in the frame-buffer 16. The image and graphics drawings to the display are performed by modifying pixel information contained in the frame-buffer by the central processing unit (CPU) 11 and a graphic accelerator 15. The increase in the display resolution and color depth requires larger density of the frame-buffer and higher data rate for the screen refresh operation and image and graphics drawings. The data rate requirement is satisfied by using single port high-speed dynamic random access memories (DRAMs) or by using an additional dedicated port for the screen refresh operation using dual port memory architecture like video random access memories (VRAMs).

The dedicated frame-buffer memory system like that shown in FIG. 1 is likely to have problems in the near future. The first problem is that of memory granularity. The number of memory chips needed to constitute the frame-buffer has been decreasing. Currently, a two megabyte (2 MB) frame-buffer can be realized with a single sixteen megabit (16 Mb) DRAM. In the next generation, where 64 Mb DRAMs are used, a single DRAM chip can contain more memory than needed for the frame-buffer. Therefore, the dedicated frame-buffer memory system will suffer a memory granularity problem. Second, since it is often the case that the frame buffer memory contains a limited amount of memory capacity (only enough for a single frame buffer), it cannot allocate multiple frame buffers in a flexible manner nor do image layer composition unless it uses additional main memory space. This kind of data handling increases its importance in multimedia operations.

Recently, Unified Memory Architecture (UMA), where the main memory and frame-buffer of electronic computer systems are combined into a single memory system, is getting a lot of attention. This is because it can reduce the total memory capacity by flexibly sharing the memory area for main memory and frame-buffer and additionally solve the granularity problem of the frame-buffer particularly for low-end PCs where only a relatively small capacity is required for the frame-buffer (currently 1–2 MB for the frame-buffer and 8–16 MB for the main memory).

Figure 2:
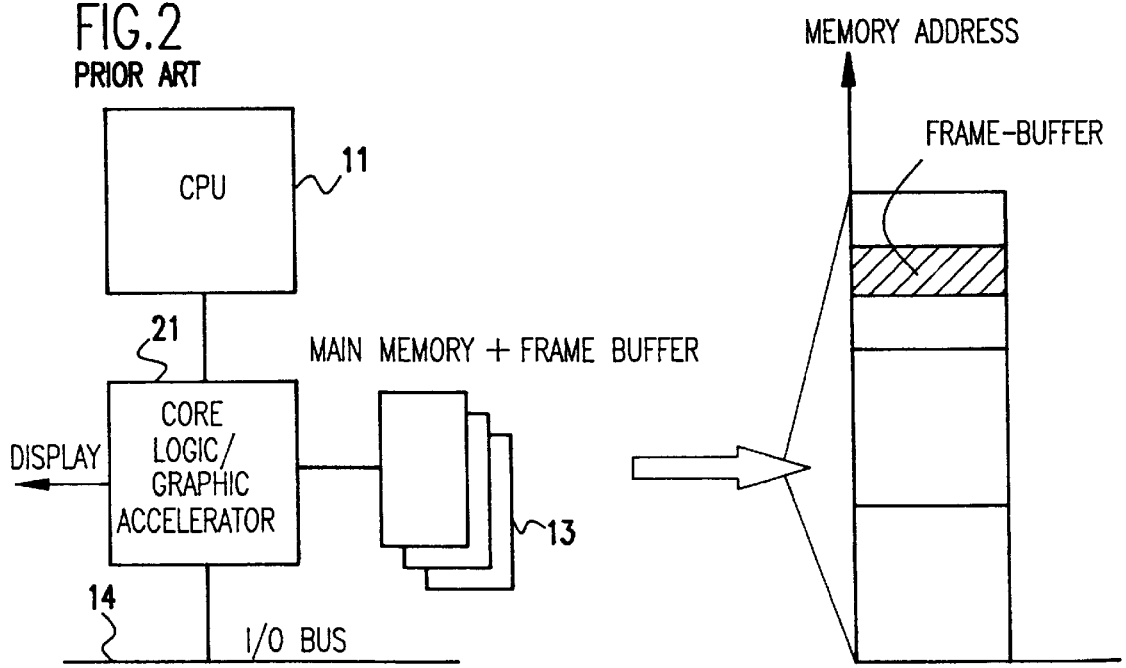
FIG. 2 is a block diagram showing a typical implementation of an existing UMA display system.

A typical UMA system is shown in FIG. 2. In this architecture, the graphic accelerator is incorporated into the core logic 21 and the frame buffer memory is part of the main memory address space.

On the other hand, the UMA has been known to have a performance problem when the computer system start to require more graphic performance and higher resolution displays. This is because the access to the memory containing a frame-buffer is much more frequent compared to others even though all of the memory access go through the same single memory port. Historically, this bandwidth requirement has been driving to separate the frame-buffer from the main memory. This severe bandwidth requirement in the UMA system is expected to be even worse in the near future. For example, a Super extended Graphics Array (SXGA) display, having a resolution of 1200×1024 pixels and 24 bits per pixel, will require more than 300 MB only for a screen refresh and more than one gigabyte (1 GB) for simultaneous memory accesses including operations of three dimensional (3D) graphics and motion pictures. It is important to note that this memory bandwidth requirement is asymmetrically distributed along the memory space. In other words, the memory bandwidth requirement is only for the specific memory address space related to the screen operations while for other memory address spaces where ordinary programs and data are stored, the bandwidth requirement is not as severe. In addition, the memory bandwidth problem in the UMA is further exasperated by the overhead resulting from the bus arbitration due to simultaneous memory accesses from multiple resources such as CPU, graphic accelerator, and so on.

Figure 3:
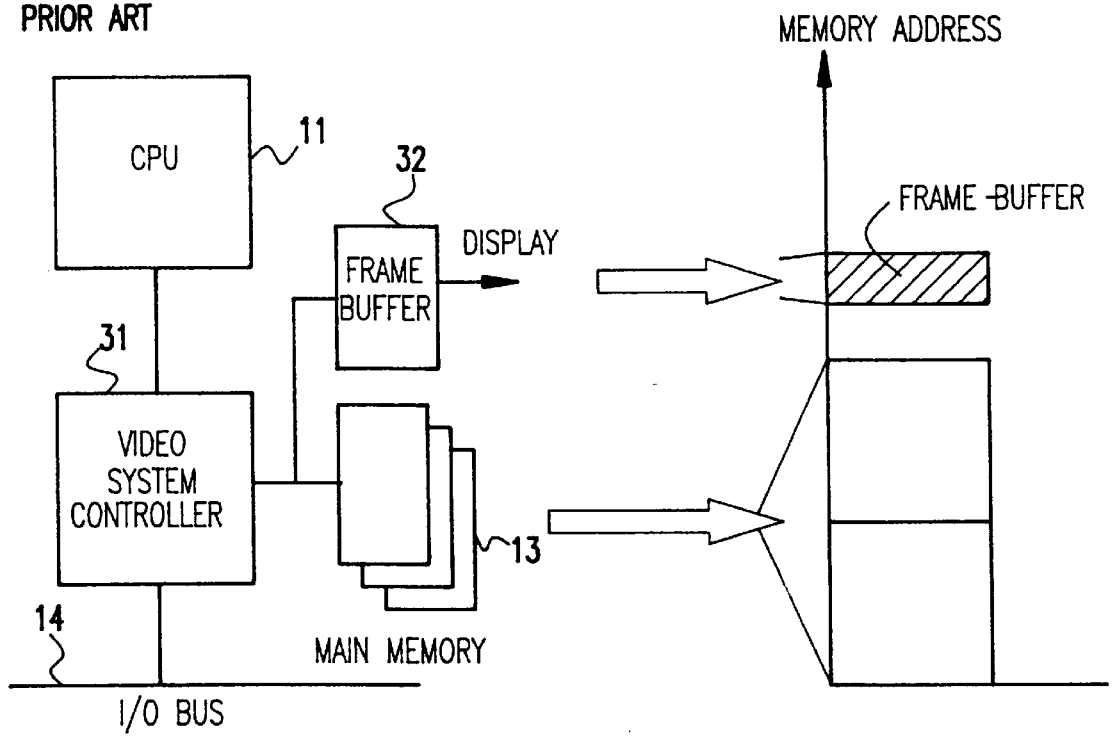
FIG. 3 is a block diagram showing a memory system of the prior art.

FIG. 3 illustrates a memory system analogous to the one disclosed in U.S. Pat. No. 4,665,495 to Thaden where DRAM and VRAM constitutes the same memory system. In this architecture, the CPU 11 communicates through a video system controller 31 to the main memory 13 and a frame-buffer 32, where the frame-buffer address space is part of the main memory address space.

This memory system somewhat relieves the memory granularity and bandwidth problems of the systems shown in FIGS. 1 and 2 by providing an additional memory port for the screen refresh operation in the UMA. However, the data bandwidth requirement is still very demanding since the frame-buffer and main memory still share the same memory port.

Figure 4:
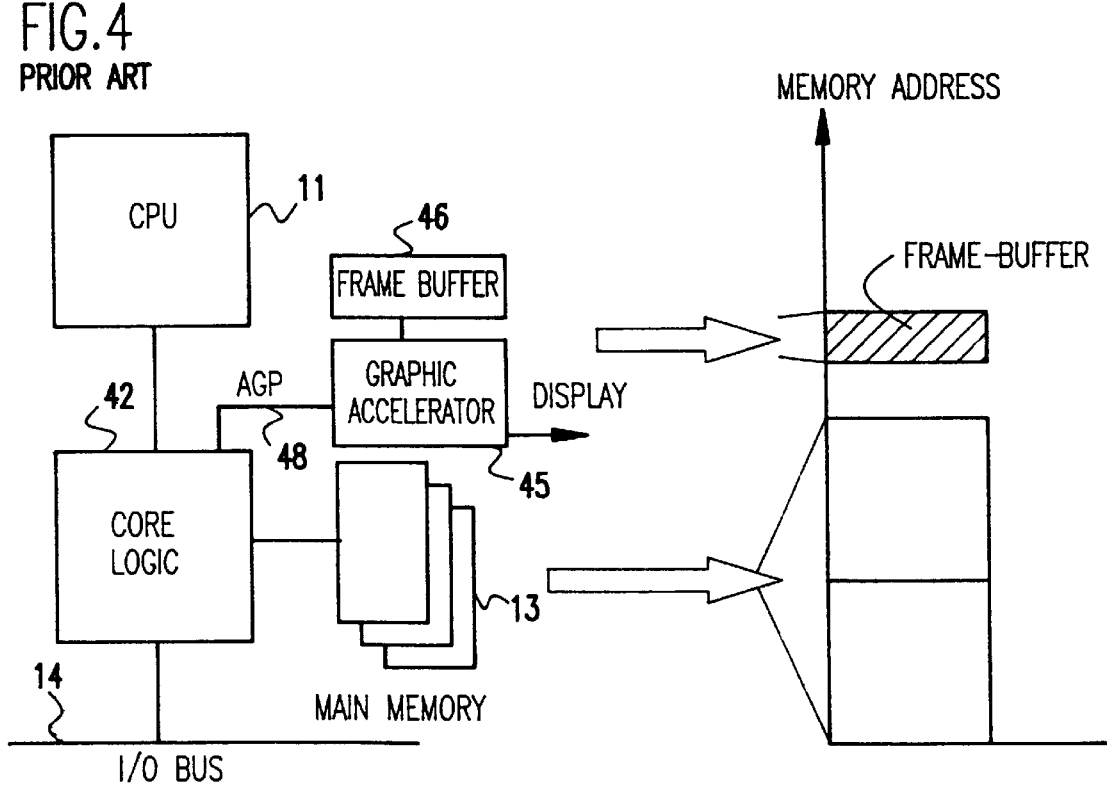
FIG. 4 is a block diagram showing a computer system with an accelerated graphics port.

FIG. 4 shows a computer system which has an accelerated graphics port (AGP). The graphics subsystem comprising the graphic accelerator 45 and frame-buffer 46 is connected to the core logic 42 through a dedicated high-speed graphic system bus 48 in order to accelerate the data transfer between the CPU 11, main memory 13 and the graphics subsystem. Part of the graphic related data, such as texture, are stored in the main memory 13.

Even though this memory system provides enough memory bandwidth performance, the frame buffer granularity problem still exists. In addition, since this system contains part of the graphic related information in the main memory, high bandwidth data flow between the main memory, frame-buffer, and CPU in this memory system configuration will consume a lot of power. Moreover, even though limited amount of frame-buffer memory size helps reducing the total memory cost, it cannot allocate multiple frame buffers flexibly.

Figure 5:
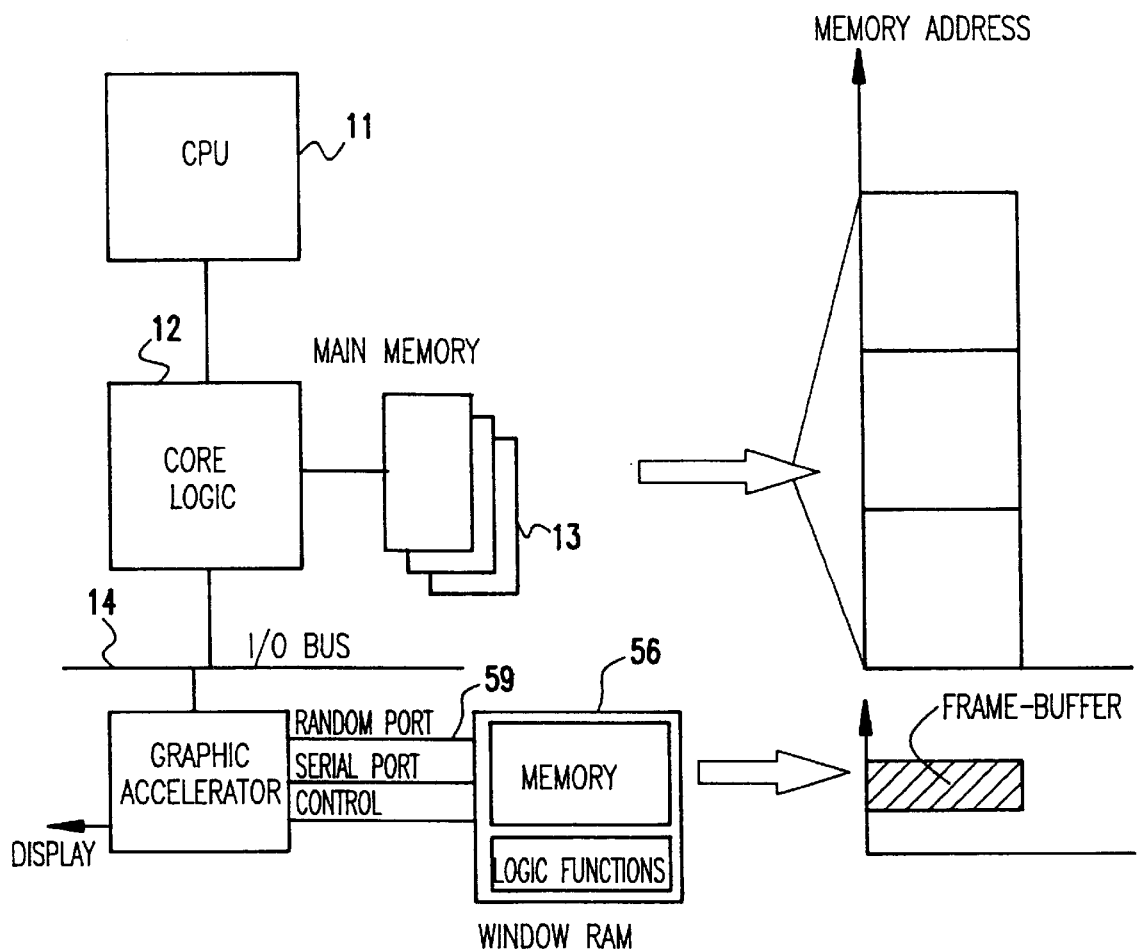
FIG. 5 is a block diagram showing a computer system with a WindowRAM for the frame-buffer.

FIG. 5 shows a computer system which uses a WindowRAM 56 for the frame-buffer. WindowRAM contains DRAM arrays, limited logic functions such as aligned BitBLT (Bit Block Transfer) functions, and an additional serial port integrated on the same chip.

The random port 59 has a standard DRAM interface with additional hard wire controls for internal logic functions. However, the external hard wire control has the following problems: First, it needs a special interface for the control. Second, the performance of the internal logic functions are limited by the slower external control signals.

Finally, the technical report of IEICE, ICD93-105, 1993 by Yamazaki et al., addresses the importance of bandwidth problem in the UMA. It provides a solution by allowing the graphics and CPU accesses alternatively. However, again it does not address the importance of bus interface nor data-intensive computation functions.

The New Media Memory Architecture

A special memory design and an intelligent media memory architecture and a memory chip which implements the architecture are provided by this invention. The memory chip integrates bus interface logic and on-chip data-intensive computation functions with the DRAM memory macros. Two system attachment points for the new integrated DRAM and logic chip are described; the first using the local CPU bus interface, and the second using a combination of the main memory bus and an alternative system bus such as a PCI bus.

Figure 6:
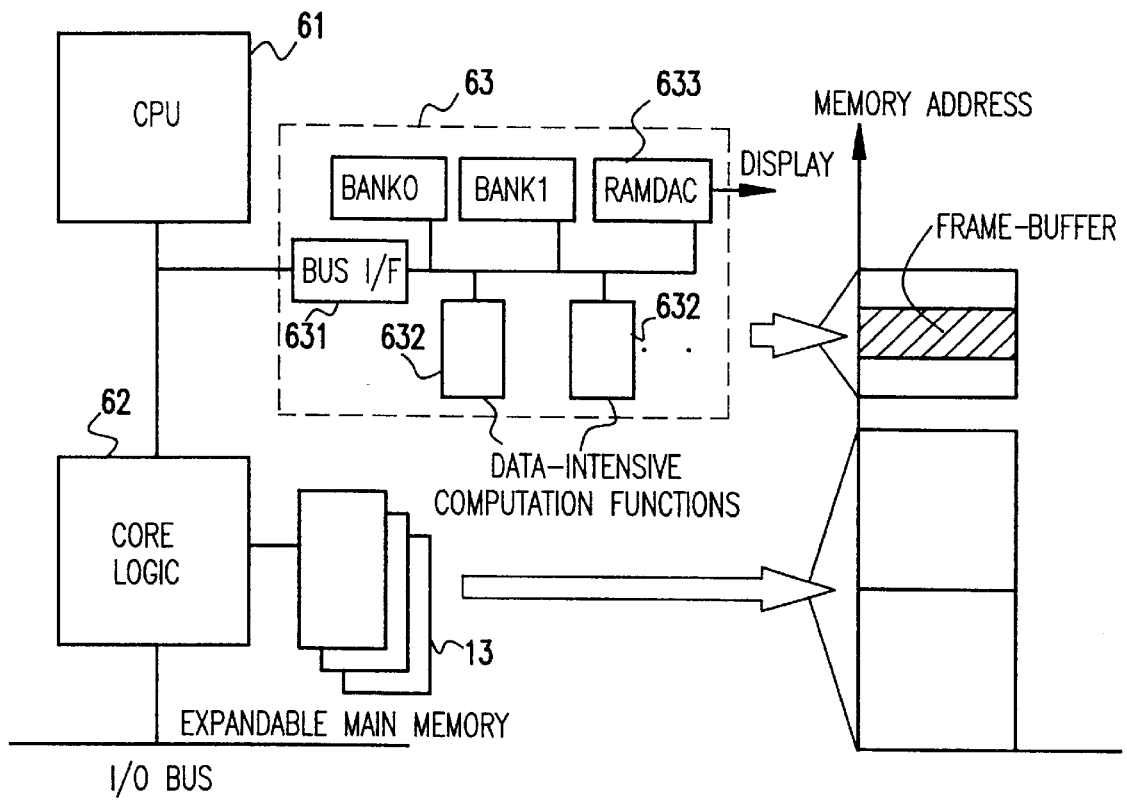
FIG. 6 is a block diagram showing the architecture according to the present invention using a CPU direct attach.

FIG. 6 shows a block diagram of a memory architecture which implements the present invention in which the attachment point is the local CPU bus 64 interface.,This architecture contains four major chips even though actual number of chips can change depending on the choice of technology, and other required functions such as L2 cache and media processor. First, a CPU 61 is responsible for general purpose data processing. Second, the architecture contains core logic chip(s) 62 that contain input/output (I/O) bus (65, 66)interfaces such as PCI and standard DRAM interface. Some of the graphic acceleration functions can be integrated into the core logic or into the CPU (such as the case for Multi-Media extension (MMX)). Third, as the key component of the present invention, a special memory 63 is required containing enough density for the main memory and frame-buffers and integrated with the bus interface circuit 631, on-chip data intensive computation functions 632, and optional RAM digital to analog converter (DAC) function 633. The memory is arranged in a multiple bank architecture for reduced latency and improved data bandwidth. Data-intensive computation functions 632 can perform functions such as BitsLT(Bit Block Transfer), rendering, z-compare, alpha-blending, the motion compensation in the MPEG decoding for efficient image layer compositions. The CPU 61 and/or core logic 62 takes care of the rest of computations, such as geometry calculations and DCTs (Discrete Cosine Transformation) for MPEG, that are not limited by the memory bandwidth. Finally, standard DRAMs 64 are added if expansion is needed. They are mainly for storing ordinary programs and data with less severe bandwidth requirement.

The command control from the CPU 61, or else through the bus interface 631, allows the software control of the intelligent media memory functions without any hard wire control. This is advantageous not only because special interface design is avoided but also microscopic control of the on-chip logic functions can be done internally. Note that the control and address sequence generations can be a serious overhead since the maximum bit operation capability inside the memory would be as much as thirty-four gigabits (34 Gb) (assuming 133 MHz and 256-bit) which will be sixteen times faster than today's high-end personal computer graphic systems (assuming 33 MHz and 64-bit). The memory system architecture according to this first embodiment of the invention can take an advantage of this high on-chip bandwidth in order to boost the performance of UMA-based memory system.

Further technology advances will realize integration of core logic and the memory or, as an ultimate goal, the CPU as a natural enhancement of the present invention.

Figure 7:
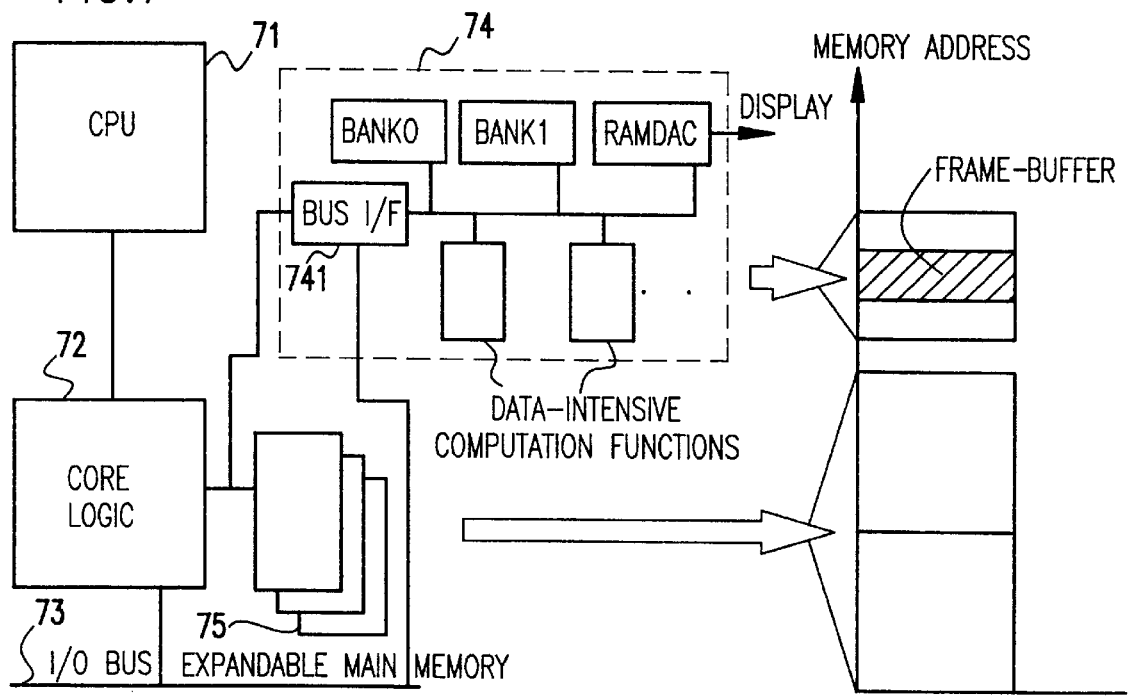
FIG. 7 is a block diagram showing the architecture according to the present invention using a conventional DRAM interface and PCI bus attach.

FIG. 7 shows an architecture example which has a different attachment point of the memory chip, this being a combination of the main memory bus 72 and an alternative system bus such as a PCI bus. The system contains a CPU 71 responsible for general purpose data processing, a core logic chip 72 for I/O bus 73, and memory bus 72 and I/O bus 73 interfaces 741. The memory bus interface in the core logic controls mapping and updating of the cache memory (if L2 cache is used) and the main memory 75 and frame-buffer memory. The CPU 71 accesses the frame buffer memory or the main system memory through the core logic chip 72. This allows the CPU 71 to read and write to the frame buffer memory at high bandwidth through the core logic chip 72 for image and graphic data transfer. The CPU 71 can also use the I/O bus 73 interface to transmit the command sequence to the data-intensive computation functions for acceleration of media processing functions such as graphic rasterization, BitBLT, and image layer compositions. PCI as well as AGP can be the choice for the I/O bus 73 interface. Arbitration between the memory accesses can be handled by request/grant scheme such as proposed by the VESA unified memory committee (VUMA).

Figure 8:
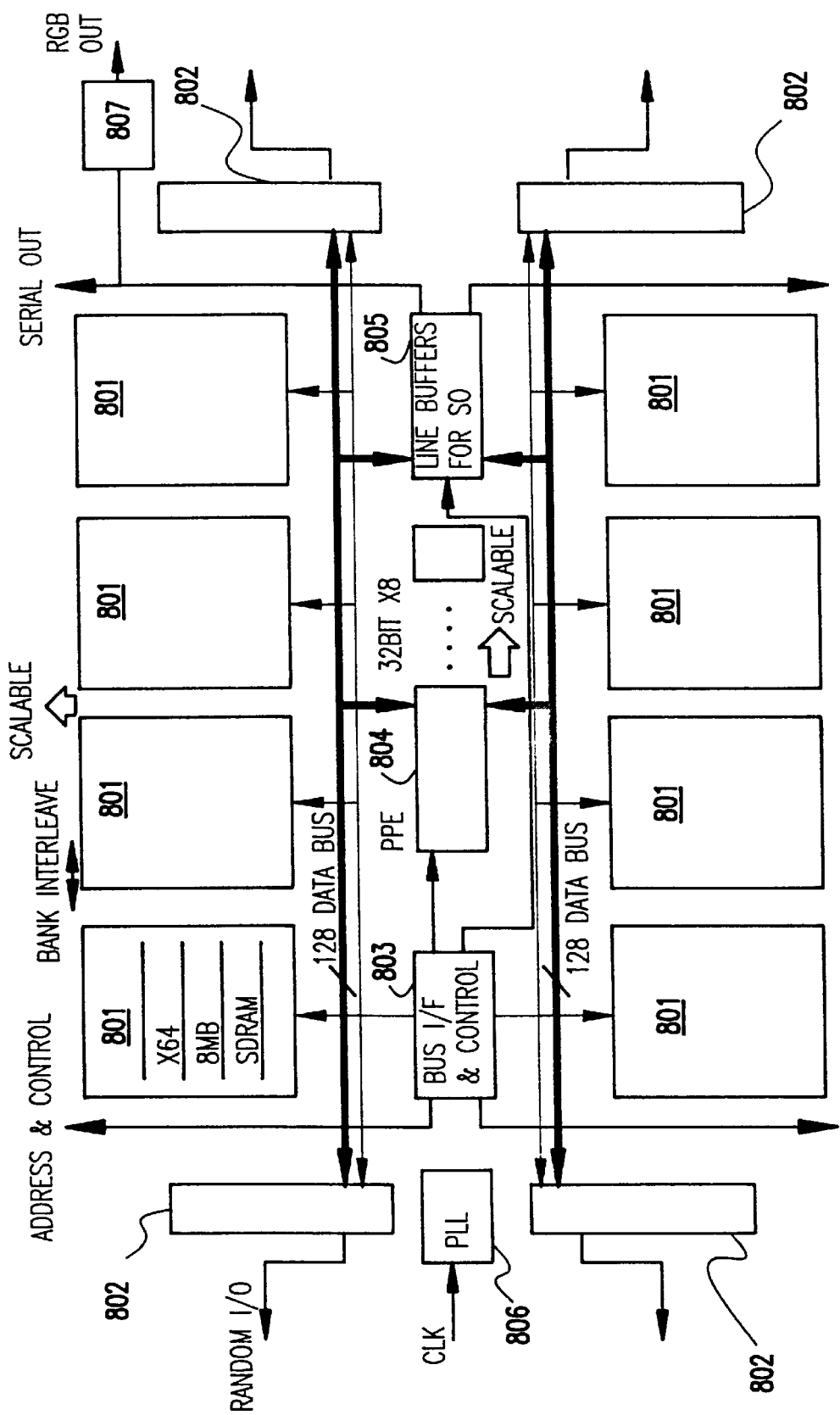
FIG. 8 is a block diagram of the intelligent media memory according to a preferred embodiment of the invention adapted for attachment as shown in FIG. 6.

As a specific example of an implementation of the intelligent media memory architecture according to the invention adapted for attachment as shown in FIG. 6, reference is made to FIG. 8. Scalable synchronous DRAM (SDRAM) is divided into eight megabit (8 Mb) blocks 801, each with a 64-bit data bus. A total of eight blocks of SDRAM array are provided in this implementation, providing a total of eight megabytes (8 MB) of dynamic memory. A 64-bit data bus interface is constructed with four parallel 16-bit ports connecting to temporary storage registers or line buffers 802, which are used as an interface between the DRAM arrays 801, input/output (I/O) ports and pixel processing engine (PPE) 804. The bus interface and control block 803 is used to control the transfer of data between macro blocks and the external system bus. The processing engine 804 is used for local processing of data. A secondary storage 805 is used for buffering processed pixel data for output through an optional serial port, or as an input to a RAM DAC macro 807 for conversion to analog red, green and blue (RGB) signals for driving a CRT display. Clock signals for the various macros on the chip are supplied by phase locked loop (PLL) 806 which receives an external clock (CLK) signal.

The implementation shown in FIG. 8 is but one example of the intelligent media memory chip according to the invention, and those skilled in the art will recognize that this example is scalable to provide even greater video memory capability and through put. A first preferred embodiment of the present invention which has an attachment point as shown in FIG. 6 therefore incorporates the following:

1. Integrate DRAM memory large enough for both the main memory and frame buffer(s) with bus interface and data-intensive computation functions. If a certain computation is limited not by the logic speed, but by the memory bandwidth, that computation is defined as the data-intensive computation. The bus interface contains the circuits responsible for the command interpreter for microscopic command generation and sequence control of the internal logic functions.
2. The chip contains an alternative output port for screen refresh operations.
3. The chip contains a RAM digital to analog converter (DAC) macro which can provide color palette and digital to analog conversion of the screen output data for CRT displays.
4. Allow the main CPU direct access to the frame buffer memory or the main system memory. This allows the CPU to read and write to the frame buffer memory at higher bandwidth compared to the case going through core logic chip and I/O bus 66. The CPU can transmit the command sequence to the data-intensive computation functions for acceleration of media processing functions such as graphic rasterization, BitBLT, and image layer compositions.
5. Expansion of main system memory is accomplished by placing industry standard memory components in parallel to the proposed circuit on the memory bus 65. The expanded memory will not be used for frame buffer storage, so the bandwidth requirements are not so severe.

The advantages of the above architecture according to the first embodiment of the invention are as follows:

1. It solves the performance problem in the UMA by virtually avoiding the overhead due to screen refresh operation by providing a comparable performance to that of VRAM-based dedicated frame-buffer system.
2. The architecture further improves the performance of the UMA-based memory system since the memory can also be randomly accessed from the CPU without going though the core logic and GUI. Therefore, the access is much faster than that of conventional UMA system.
3. It can even further enhance the performance of screen related operations by doing data-intensive computation function inside the memory.
4. The chip contains bus interface circuit integrated on the chip. The bus interface circuit is mandatory for bus arbitration between several on-chip as well as off-chip functions. It also provides the frequency conversion need from the difference between the external and internal clock frequency.
5. Since the chip is directly attached to the local bus 64, it does not need additional hard wires to control the memory operations. The command can be passed from the CPU to the memory by sending command sequence to a certain I/O address or writing to a register specifically mapped into the address space.
6. The control overhead of the on-memory functions can be much less compared to the external hard wire control since the control signals can run at faster internal clock frequency.
7. The present invention permits multiple frame-buffers flexibly located in the chip and also allows image composition functions between the frame-buffers on the chip.

This configuration is, in particular, advantageous if ultra-high density DRAMs, such as 64 Mb and beyond, are used, since a single chip with 64-bit I/Os can itself consist of a memory of 8 MB or more, enough (at least for low-end) for frame-buffer and other buffers related to 3D graphics and motion pictures. We can use standard (low cost slower performance) DRAMs if more memory is needed for programs, data, so on.

The second preferred embodiment of the invention is a variation of the first in that it is specifically adapted for attachment as shown in FIG. 7. The second preferred embodiment therefore incorporates the following:

1. Integrate DRAM memory large enough for both the main memory and frame buffer(s) with bus interface and data-intensive computation functions.
2. The chip contains an industry standard memory bus 77 with bus arbitration signals to allow direct memory accesses by the system core logic to the integrated system memory and frame buffer memory. The circuit 741 also contains an alternative I/O bus port such as a PCI (Peripheral Component Interface) bus for the command interpreter for microscopic command generation and sequence control of the internal logic functions.
3. The chip contains an alternative output port for screen refresh operations. Alternatively, the chip contains a RAM DAC which can provide color palette, and digital to analog conversion of the screen output data for CRT displays.
4. Allow the main CPU direct access to the frame buffer memory or the main system memory through the core logic chip. This allows the main CPU to read and write to the frame buffer memory at high bandwidth through the core logic chip set for image and graphic data transfer. The CPU can also use the I/O bus 73 interface to transmit the command sequence to the data-intensive computation functions for acceleration of media processing functions such as graphic rasterization, BitBLT, and image layer compositions.
5. Expansion of main system memory is accomplished by placing industry standard memory components in parallel to the proposed circuit on the memory bus 77. The expanded memory will not be used for frame buffer storage, so the bandwidth requirements are not so severe.

The advantages of the above architecture are as follows:

1. It can solve the bandwidth performance problem in the UMA by allowing an integrated wide data bus connection to the frame buffer memory to efficiently transfer the frame buffer data for screen refresh operations to the integrated palette/DAC.
2. The architecture has an advantage over VRAM-based dedicated frame buffer system in that the frame buffer memory is integrated with the palette/DAC to allow efficient high bandwidth transfers without addition power of driving data onto the system board.
3. It provides optional local processing function to increase the performance of graphic rasterization functions and video decoding for reduced off-chip bandwidth requirement and lower power consumption for the same amount of computation.
4. The memory bus 77 arbitration can be used to avoid conflicts in memory access between the integrated processor and palette and the main core logic.
5. The system can be implemented with minimal changes to existing personal computer architectures since the additional chip is placed off the local bus 76 and only uses conventional memory bus 74 interface and system bus 73 interfaces, and does not need any special modifications to existing core logic chips.

While the invention has been described in terms of preferred embodiments with an example of a specific implementation, those skilled in the art will recognize that the invention can be practiced with modification within the spirit and scope of the appended claims.

Having thus described our invention, what we claim as new and desire to secure by Letters Patent is as follows:

1. A computer system implementing a Unified Memory Architecture (UMA) in which main memory and frame-buffer of a display system are combined into a single memory system, said computer system comprising:

a central processing unit (CPU) for general purpose data processing functions of the computer system;

an input/output (I/O) bus;

expandable main memory;

core logic connected to the CPU by a local CPU bus interface and providing interfaces to the I/O bus and the main memory; and an integrated display chip implementing an intelligent media memory architecture having an integrated bus interface circuit, on-chip data intensive computation functions, and frame-buffer memory arranged in multiple bank architecture for reduced latency and improved data bandwidth, said frame-buffer memory sharing memory address space with the main memory according to the Unified Memory Architecture (UMA), said integrated display chip providing a display output.

2. The computer system recited in claim 1 wherein the integrated display chip is attached to the local CPU bus interface.

3. The computer system recited in claim 1 wherein the integrated display chip is attached to a combination of the main memory bus and an alternative system bus.

4. The computer system recited in claim 1 wherein the integrated display chip comprises:

synchronous dynamic random access memory (SDRAM) arranged in a plurality of banks, the CPU having direct access to the SDRAM of the chip and through core logic to the main memory;

a bus interface for attachment to a CPU bus and connected to the SDRAM blocks and containing circuits responsible for a command interpreter for microscopic command generation and sequence control of internal logic functions; and a pixel processing engine connected to the bus interface for local processing of display data.

5. The computer system recited in claim 4 further comprising:

an alternative output port connected to the bus interface for screen refresh operations; and a random access memory (RAM) digital to analog converter (DAC) macro connected to the bus interface and providing color palette and digital to analog conversion of the screen output data for displays.

6. The computer system recited in claim 1 wherein the integrated display chip comprises:

synchronous dynamic random access memory (SDRAM) arranged in a plurality of banks, the CPU having access through core logic to the SDRAM of the chip and to the main memory;

a bus interface for attachment to a memory bus connecting the core logic and the main memory and to an input/output (I/O) bus, the bus interface being connected to the SDRAM blocks and containing circuits responsible for a command interpreter for microscopic command generation and sequence control of internal logic functions; and a pixel processing engine connected to the bus interface for local processing of display data.

7. The computer system recited in claim 6 further comprising:

an alternative output port connected to the bus interface for screen refresh operations; and a random access memory (RAM) digital to analog converter (DAC) macro connected to the bus interface and providing color palette and digital to analog conversion of the screen output data for displays.

* * * * *